(12) United States Patent
Chen et al.

(10) Patent No.: US 9,004,764 B2
(45) Date of Patent: Apr. 14, 2015

(54) LINEAR GUIDE ASSEMBLY

(71) Applicant: Precision Motion Industries, Inc., Taichung (TW)

(72) Inventors: Meng-Yi Chen, Taichung (TW); Wayne Cheng, Taichung (TW)

(73) Assignee: Precision Motion Industries, Inc., Taichung (TW)

( * ) Notice: Subject to any disclaimer, the term of this patent is extended or adjusted under 35 U.S.C. 154(b) by 23 days.

(21) Appl. No.: 13/862,585

(22) Filed: Apr. 15, 2013

(65) Prior Publication Data

US 2014/0307988 A1    Oct. 16, 2014

(51) Int. Cl.
*F16C 33/38* (2006.01)
*F16C 29/04* (2006.01)
*F16C 33/66* (2006.01)
*F16C 19/02* (2006.01)
*F16C 29/06* (2006.01)

(52) U.S. Cl.
CPC ............. *F16C 33/6651* (2013.01); *F16C 29/04* (2013.01); *F16C 29/063* (2013.01); *F16C 29/0638* (2013.01); *F16C 29/0654* (2013.01); *F16C 33/3825* (2013.01)

(58) Field of Classification Search
CPC ............... F16C 29/046; F16C 29/0623; F16C 29/0657; F16C 33/32; F16C 33/38; F16C 33/418; F16C 33/543; F16C 33/3285; F16C 33/66; F16C 33/6614; F16C 33/6651; F16C 33/6681; F16C 33/3843
USPC ......... 384/49, 43–45, 51, 423, 528, 534, 609, 384/614
See application file for complete search history.

(56) References Cited

U.S. PATENT DOCUMENTS

| | | | | |
|---|---|---|---|---|
| 2,412,803 A | * | 12/1946 | Dodge | 192/45.1 |
| 2,566,421 A | * | 9/1951 | Lapointe | 29/898.067 |
| 2,897,021 A | * | 7/1959 | Zeilman | 384/520 |
| 3,450,449 A | * | 6/1969 | Sibley et al. | 384/465 |
| 5,988,883 A | * | 11/1999 | Takamatu et al. | 29/898.067 |
| 6,364,086 B1 | * | 4/2002 | Blaurock et al. | 193/35 MD |
| 6,616,336 B1 | * | 9/2003 | Sayles et al. | 384/463 |
| 6,830,378 B2 | * | 12/2004 | Michioka et al. | 384/49 |
| 7,465,092 B2 | * | 12/2008 | Hsu et al. | 384/45 |
| 7,563,029 B2 | * | 7/2009 | Wu et al. | 384/51 |
| 7,802,922 B2 | * | 9/2010 | Chen | 384/51 |
| 8,057,100 B2 | * | 11/2011 | Chen et al. | 384/45 |
| 8,297,843 B2 | * | 10/2012 | Hsu | 384/45 |
| 8,408,796 B1 | * | 4/2013 | Hsu | 384/51 |
| 2004/0071373 A1 | * | 4/2004 | Keller et al. | 384/45 |

(Continued)

FOREIGN PATENT DOCUMENTS

| | | | | |
|---|---|---|---|---|
| DE | 102009031722 A1 | * | 1/2011 | F16C 33/42 |
| JP | 07279970 A | * | 10/1995 | F16C 33/38 |
| JP | 2007333011 A | * | 12/2007 | |
| JP | 2009138863 A | * | 6/2009 | F16C 33/41 |

(Continued)

*Primary Examiner* — Marcus Charles
(74) *Attorney, Agent, or Firm* — Ming Chow; Sinorica, LLC

(57) ABSTRACT

A linear guide assembly has a bar device, multiple partitions, multiple containing spaces and multiple rolling balls. The partitions are mounted between two bars of the bar device at intervals to form the containing spaces. The rolling balls are respectively and rotatably mounted in the containing spaces. Each partition has multiple first protrusions and multiple second protrusions. Each rolling ball is in point-contact with the first protrusions and the second protrusions of adjacent two of the partitions. With the point-contact configuration, an outer surface of each rolling ball is lubricated by much oil.

13 Claims, 15 Drawing Sheets

(56) References Cited

U.S. PATENT DOCUMENTS

2004/0234181 A1* 11/2004 Kobayashi et al. ........... 384/528
2007/0110345 A1* 5/2007 Hsu et al. ...................... 384/45
2008/0025653 A1* 1/2008 Matsumoto .................... 384/43

FOREIGN PATENT DOCUMENTS

| JP | 2010196801 A | * | 9/2010 | ............. F16C 33/66 |
| JP | 2012137177 A | * | 7/2012 | ............. F16C 33/38 |
| JP | 2013068249 A | * | 4/2013 | |

* cited by examiner

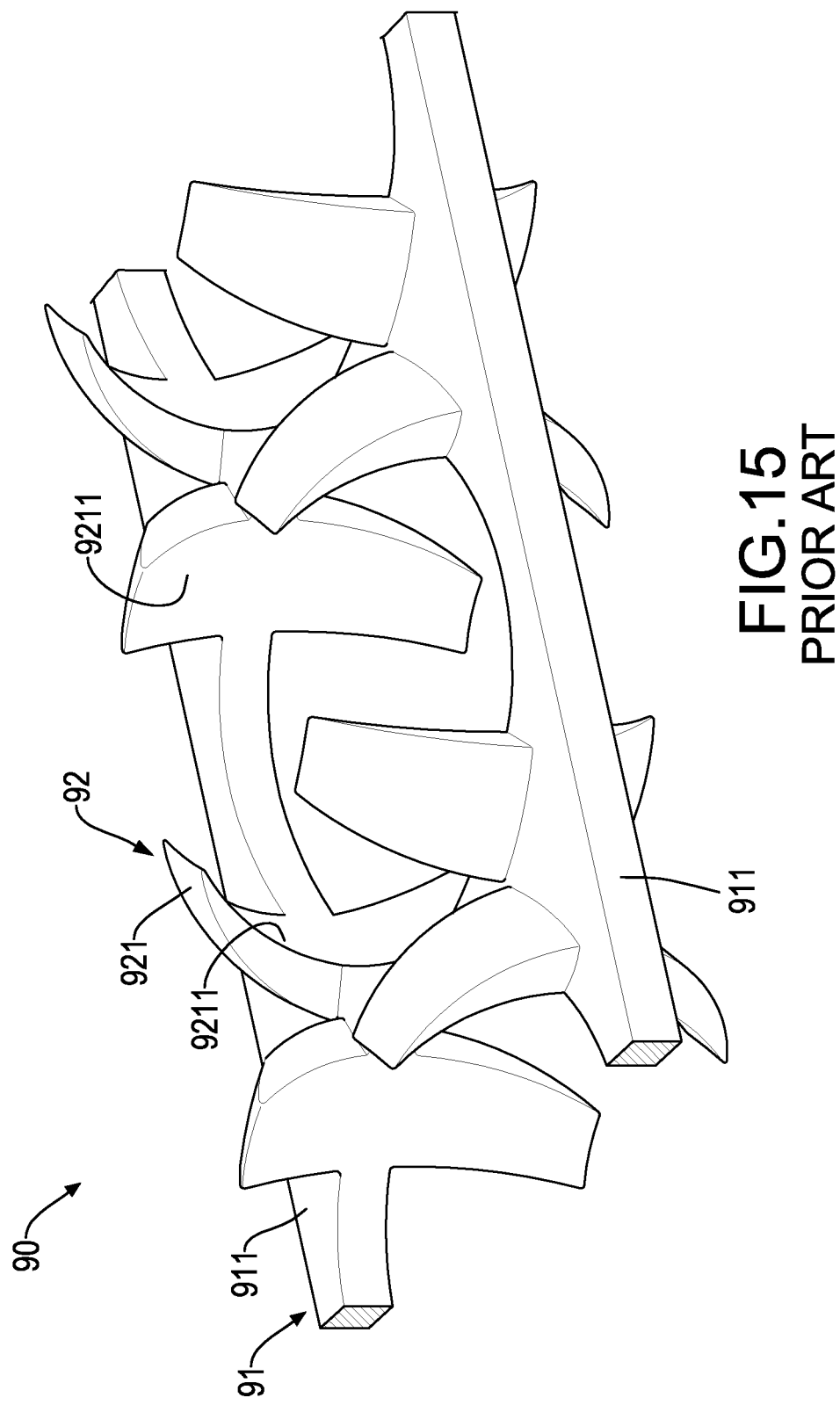

LINEAR GUIDE ASSEMBLY

BACKGROUND OF THE INVENTION

1. Field of the Invention

The present invention relates to a linear guide assembly, and more particularly to a linear guide assembly having a point-contact configuration.

2. Description of Related Art

With reference to FIG. 14, a conventional linear guide assembly 80 has a bar device 81, multiple partitions 82 and multiple rolling balls 83. The bar device 81 has two bars 811. The partitions 82 and the rolling balls 83 are mounted between the bars 811 at intervals. Each partition 82 has multiple concave surfaces 821. Each rolling ball 83 is in surface-contact with the corresponding concave surfaces 821. The rolling balls 83 are held by the concave surfaces 821 and are still rotatable.

However, each rolling ball 83 is in surface-contact with the concave surfaces 821. A large area of an outer surface of each rolling ball 83 is touched by the concave surfaces 821, instead of the oil. Accordingly, a friction between the rolling ball 83 and the concave surfaces 821 is large, and the rolling ball 83 cannot rotate smoothly and make noises. Nevertheless, each partition 82 does not have any structure to store the oil, so the oil easily escapes from the partition 82 and the rolling ball 83.

With reference to FIG. 15, another conventional linear guide assembly 90 has a bar device 91 and multiple partitions 92. The bar device 91 has two bars 911. The partitions 92 are mounted between and securely connected with the bars 911 and are arranged at intervals. Each partition 92 has four protuberant paws 921. Each paw 921 has a concave paw surface 9211. Each rolling ball is in surface-contact with the eight paw surfaces 9211.

Similarly, each rolling ball is still in surface-contact with the paw surfaces 9211. Consequently, a friction between the rolling ball and the paw surfaces 9211 is still large, and each paw 921 does not have any structure to store the oil.

To overcome the shortcomings, the present invention tends to provide a linear guide assembly to mitigate the aforementioned problems.

SUMMARY OF THE INVENTION

The main objective of the invention is to provide a linear guide assembly having a point-contact configuration.

A linear guide assembly has a bar device, multiple partitions, multiple containing spaces and multiple rolling balls. The partitions are mounted between two bars of the bar device at intervals to form the containing spaces. The rolling balls are respectively and rotatably mounted in the containing spaces. Each partition has multiple first protrusions and multiple second protrusions. Each rolling ball is in point-contact with the first protrusions and the second protrusions of adjacent two of the partitions. With the point-contact configuration, an outer surface of each rolling ball is lubricated by much oil.

Other objects, advantages and novel features of the invention will become more apparent from the following detailed description when taken in conjunction with the accompanying drawings.

BRIEF DESCRIPTION OF THE DRAWINGS

FIG. 15 is an enlarged perspective view of another conventional linear guide assembly in accordance with the prior art, showing the rolling balls are removed.

DETAILED DESCRIPTION OF PREFERRED EMBODIMENT

Figure 1:
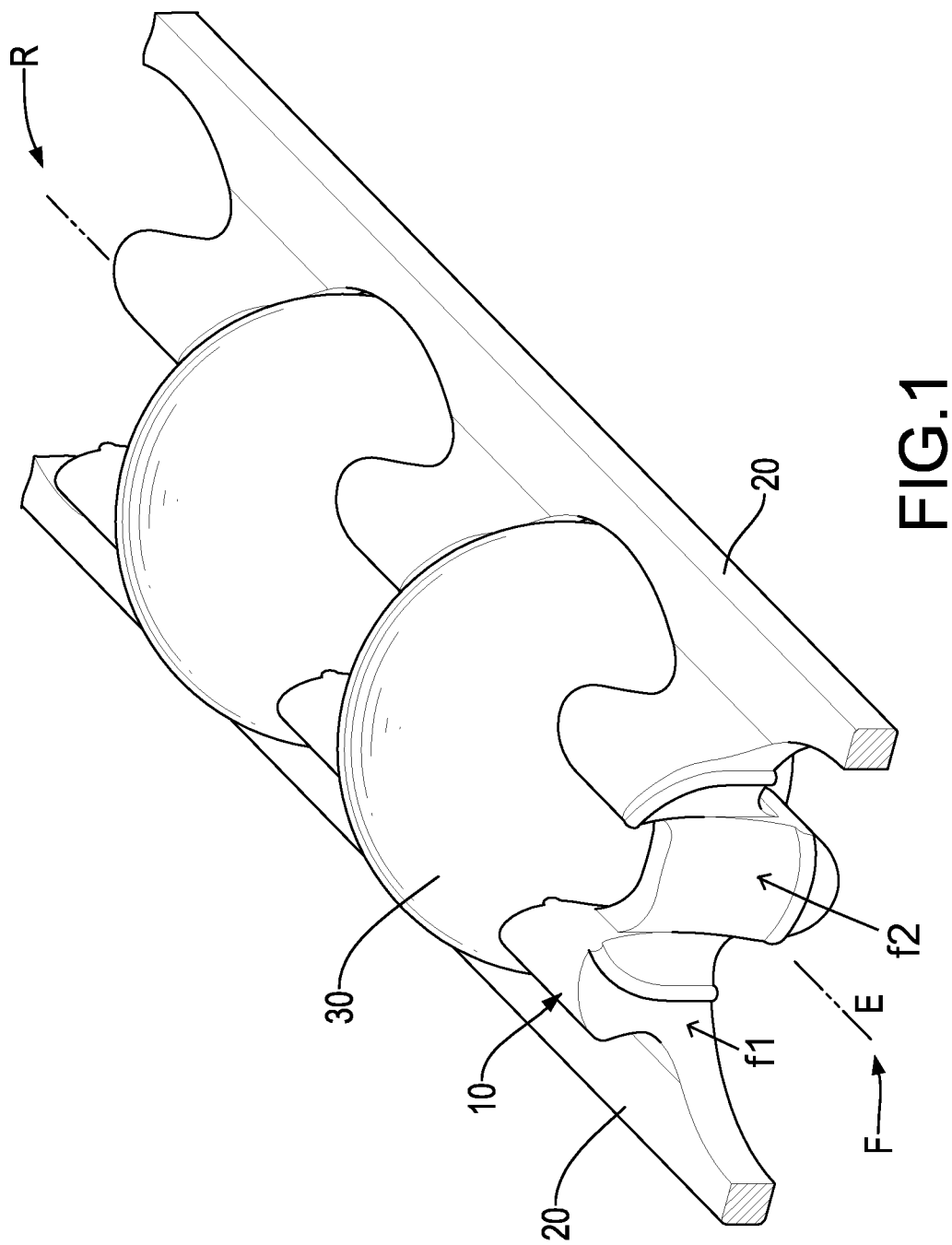
FIG. 1 is an enlarged top perspective view of a first embodiment of a linear guide assembly in accordance with the present invention.
Figure 2:
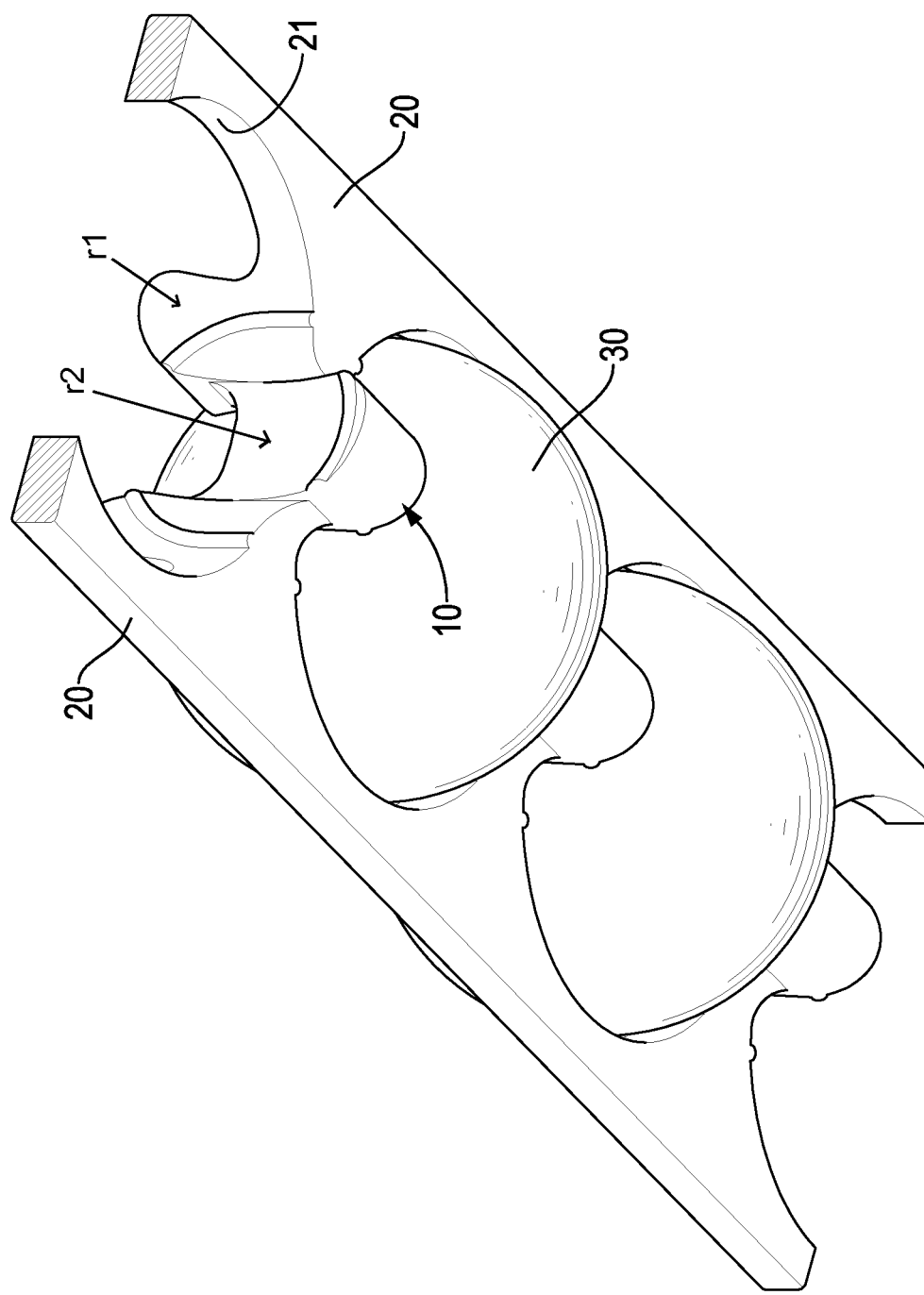
FIG. 2 is an enlarged bottom perspective view of the linear guide assembly in FIG. 1.
Figure 3:
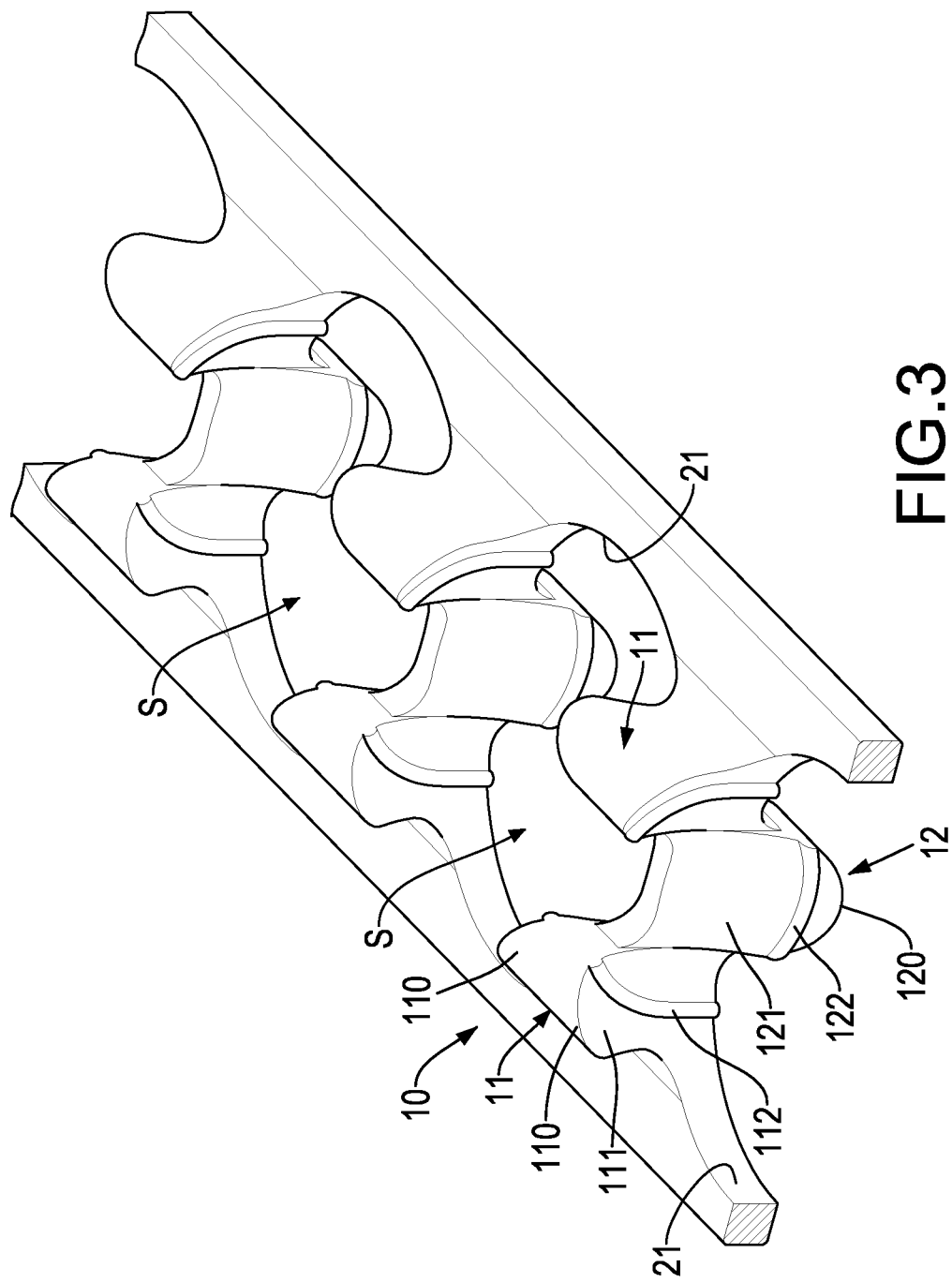
FIG. 3 is an enlarged top perspective view of the linear guide assembly in FIG. 1 showing the rolling balls are removed.

With reference to FIGS. 1 to 3, a first embodiment of a linear guide assembly in accordance with the present invention comprises a bar device, multiple partitions 10, multiple containing spaces S and multiple rolling balls 30. Each containing space S is located adjacent two of the partitions 10. The rolling balls 30 are respectively mounted in the containing spaces S.

The bar device is resilient and has a front side F, a rear side R, an extending direction E and two bars 20. The rear side R of the bar device is opposite to the front side F of the bar device. The two bars 20 are parallel to each other. Each bar 20 has an inner side. The inner side of each bar 20 faces that of the other bar 20 and has multiple recesses 21 arranged at intervals. The recesses 21 of the bar 20 respectively align with those of the other bar 20.

Figure 4:
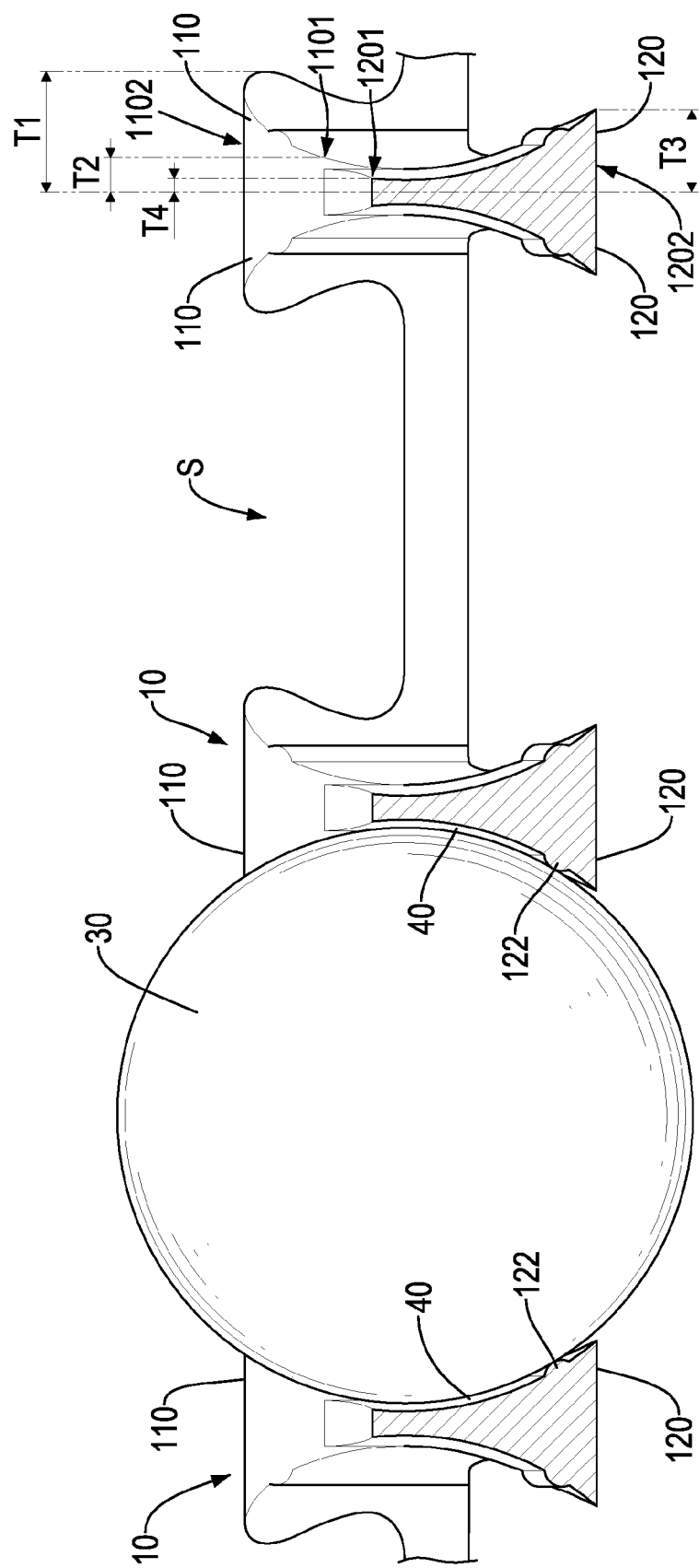
FIG. 4 is an enlarged side view in partial section of the linear guide assembly in FIG. 1.
Figure 5:
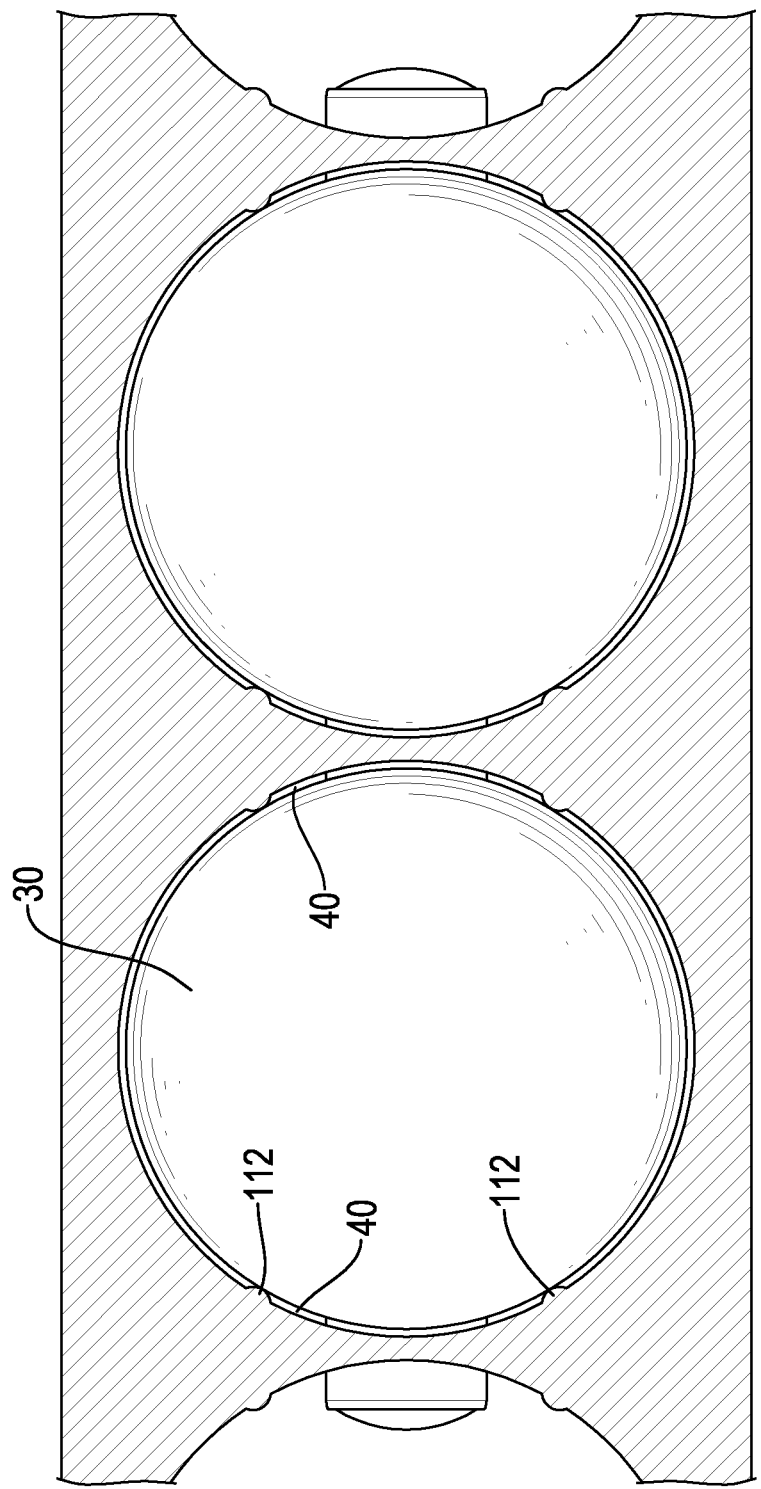
FIG. 5 is an enlarged top view in partial section of the linear guide assembly in FIG. 1.

With reference to FIGS. 3 to 5, the partitions 10 are mounted between the bars 20 and are arranged at intervals along the extending direction E of the bar device. Each partition 10 has two first restricted sections 11 and a second restricted section 12.

The two first restricted sections 11 of the each partition 10 are respectively and securely mounted on the inner sides of the bars 20 beside the recesses 21 and align with each other. Each first restricted section 11 has a front side f1, a rear side r1, two first restricted surfaces 111 and two first protrusions 112. The front side f1 of each first restricted section 11 faces the front side F of the bar device. The rear side r1 is opposite to the front side f1 of each first restricted section 11 and faces the rear side R of the bar device.

The two first restricted surfaces 111 of each first restricted section 11 are concave, are respectively formed on the front side f1 and the rear side r1 of the first restricted section 11.

The two first protrusions 112 of each first restricted section 11 respectively protrude from the first restricted surfaces 111. Preferably, each first protrusion 112 is an arcuate rib. The term "arcuate" in the present invention defines as a segment of a spheroid, which is similar to a ball, but not perfectly round.

Preferably, each first restricted section 11 has two first paws 110 on which the two first restricted surfaces 111 of the first restricted section 11 are respectively formed.

The two first paws 110 of each first restricted section 11 protrude upwardly and respectively face the front side F and the rear side R of the bar device. Each first paw 110 has a proximal end 1101 and a distal end 1102 opposite to the proximal end 1101 of the first paw 110. The distal end 1102 of each first paw 110 protrudes toward a corresponding adjacent one of the containing spaces S, such that the distal end 1102 of the first paw 110 is protuberant relative to the proximal end 1101 of the first paw 110. A thickness T1 of the distal end 1102 of each first paw 110 is larger than a thickness T2 of the proximal end 1101 of the first paw 110.

The second restricted section 12 of each partition 10 is located between the two first restricted sections 11 of the partition 10 and has a front side f2, a rear side r2, two second restricted surfaces 121 and two second protrusions 122. The front side f2 of the second restricted section 12 of each partition 10 faces the front side F of the bar device. The rear side r2 is opposite to the front side f2 of each second restricted section 12 and faces the rear side R of the bar device.

The two second restricted surfaces 121 of the second restricted section 12 of each partition 10 are concave, are respectively formed on the front side f2 and the rear side r2 of the second restricted section 12. The two second protrusions 122 of each partition 10 respectively protrude from the second restricted surfaces 121. Preferably, each second protrusion 122 is an arcuate rib.

Preferably, each second restricted section 12 has two second paws 120 on which the two second restricted surfaces 121 are respectively formed. The two second paws 120 of each second restricted section 12 protrude downwardly and respectively face the front side F and the rear side R of the bar device.

Each second paw 120 has a top end 1201 and a bottom end 1202 opposite to the top end 1201 of the second paw 120. The bottom end 1202 of each second paw 120 protrudes toward a corresponding adjacent one of the containing spaces S, such that the bottom end 1202 of the second paw 120 is protuberant relative to the top end 1201 of the second paw 120. A thickness T3 of the bottom end 1202 of each second paw 120 is larger than a thickness T4 of the top end 1201 of the second paw 120.

With reference to FIGS. 3 and 4, the containing spaces S are formed between the bars 20 beside the partitions 10 and arranged at intervals along the extending direction E of the bar device. Each containing space S is formed between adjacent two of the partitions 10 and two of the recesses 21 those align with each other. Because the first protrusions 112 and the second protrusions 122 protrude into a corresponding one of the containing spaces S, a shape of each containing space S is spheroid.

With reference to FIGS. 4 and 5, each containing space S has two oil-storage areas 40. The two oil-storage areas 40 of each containing space S are respectively located at two opposite sides of a corresponding one of the rolling balls 30. Each oil-storage area 40 is formed between the side of the rolling ball 30, the two first protrusions 112 of a corresponding one of the partitions 10 and the second protrusion 122 of the corresponding adjacent one of the partitions 10.

Figure 7:
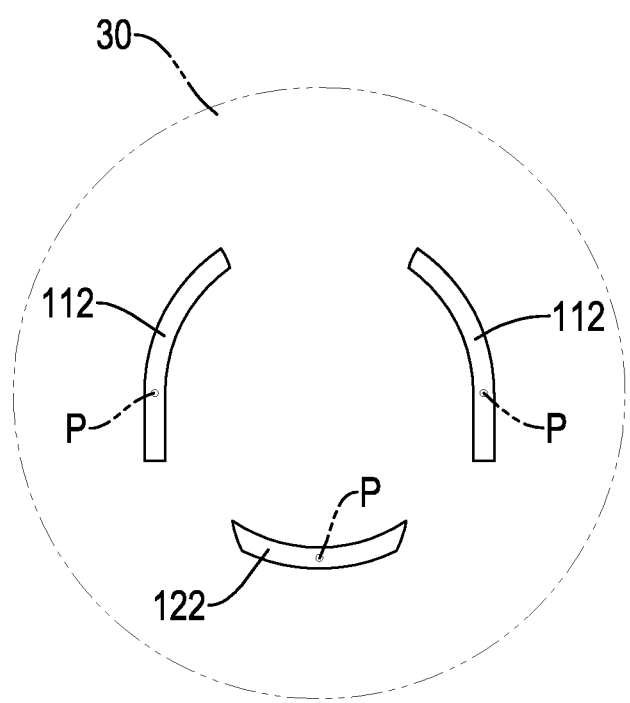
FIG. 7 is an enlarged schematic side view of each rolling ball of the linear guide assembly in FIG. 1 showing that the rolling ball is point-contact with the two first protrusions of a corresponding adjacent one of the partitions and the second protrusion of the corresponding adjacent one of the partitions.

With reference to FIGS. 1, 4, 5, and 7, the rolling balls 30 are respectively and rotatably mounted in the containing spaces S. Each rolling ball 30 is in point-contact with the four first protrusions 112 of adjacent two of the partitions 10 and the two second protrusions 122 of the adjacent two of the partitions 10. In the first embodiment, the first protrusions 112 and the second protrusions 122 can be in point-contact with the rolling balls 30 because the first protrusions 112 and the second protrusions 122 are arcuate, as defined in the above description. With reference to FIG. 7, three points P represent that one side of each rolling ball 30 is in point-contact with the two first protrusions 112 of a corresponding adjacent one f the partitions 10 and the second protrusion 122 of the corresponding adjacent one of the partitions 10. Preferably, the two first protrusions 112 and the second protrusion 122 which are in point-contact with the same side of a corresponding one of the rolling balls 30 are arranged at a circular line.

With reference to FIGS. 4 and 5, because the first protrusions 112 and the second protrusions 122 protrude into a corresponding one of the containing spaces S, the shape of each containing space S is spheroid. Furthermore, the first protrusions 112 and the second protrusions 122 are in point-contact with the corresponding rolling ball 30 to hold the rolling ball 30 and to allow the rolling ball 30 to rotate. Because the first protrusions 112 and the second protrusions 122 are in point-contact with the corresponding rolling ball 30, an outer surface of each rolling ball 30 is touched by more oil than a conventional rolling ball is. Accordingly, a friction between each rolling ball 30 and the two adjacent partitions 10 is effectively reduced, and the rolling balls 30 can rotate very smoothly.

In the first embodiment, the first protrusions 112 and the second protrusions 122 are arcuate, so the first protrusions 112 and the second protrusions 122 can still be in point-contact with the corresponding rolling ball 30 even when the rolling ball 30 are shifted from the corresponding containing space S. The arcuate first protrusions 112 and second protrusions 122 also help the corresponding rolling ball 30 to stably stay in a central position of the containing space S, to reduce a shifting degree of the rolling ball 30, and to make the rolling ball 30 smoothly rotate.

With the protuberant second paws 120 and the protuberant first paws 110, the corresponding rolling ball 30 can be surrounded by the second paws 120 and the first paws 110 and be prevented from falling off the corresponding containing space S.

Figure 6:
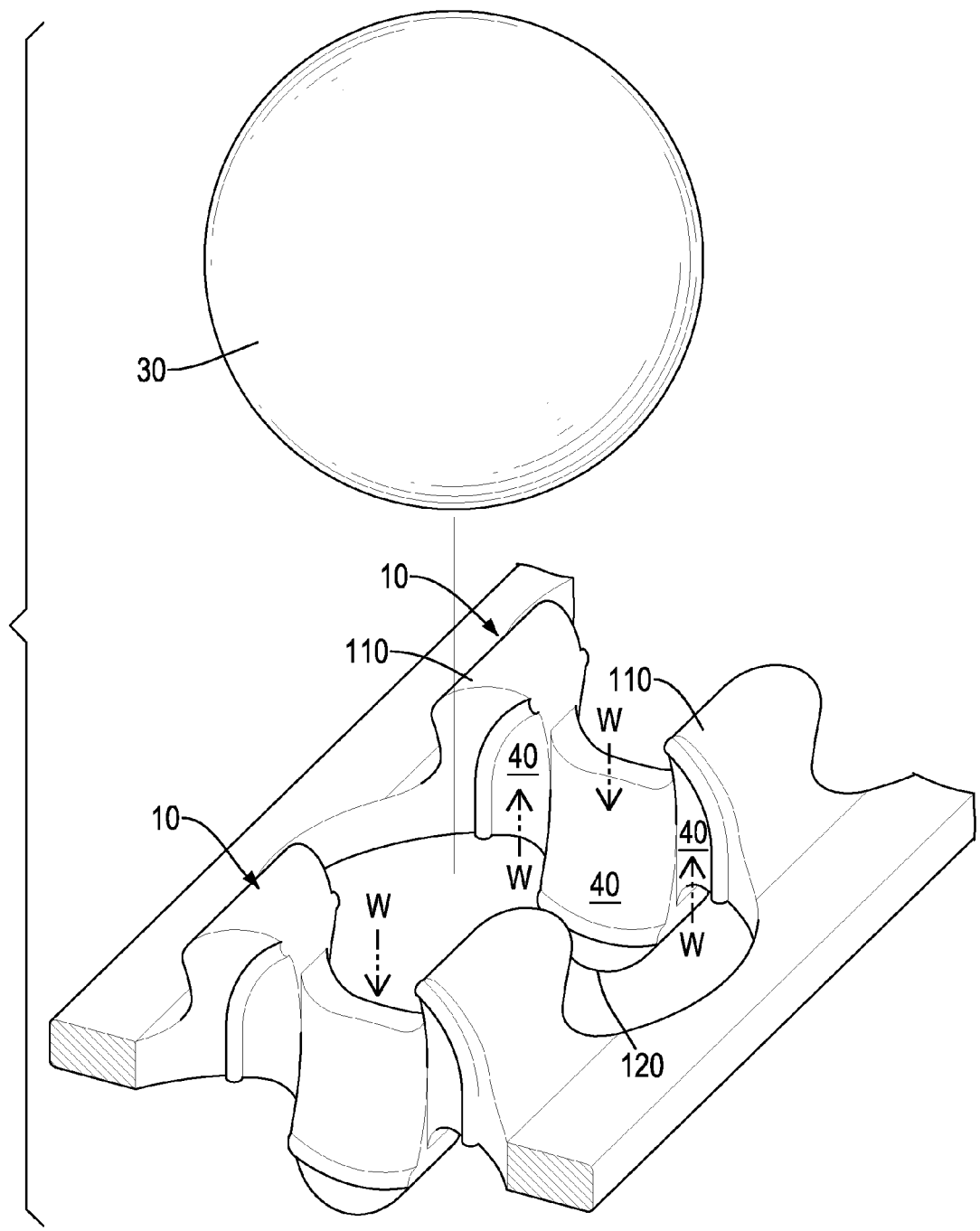
FIG. 6 is an enlarged exploded perspective view of the linear guide assembly in FIG. 1.

With reference to FIGS. 3 and 6, oil can be injected into the two oil-storage areas 40 along multiple dotted arrows W. With the oil-storage areas 40, the present invention can effectively keep the oil and the oil facilitates the smooth rotation of the rolling ball 30. Because the two oil-storage areas 40 of each containing space S communicate with each other, the oil can be filled within the containing space S evenly such that the rolling ball 30 can rotate smoothly.

Figure 8:
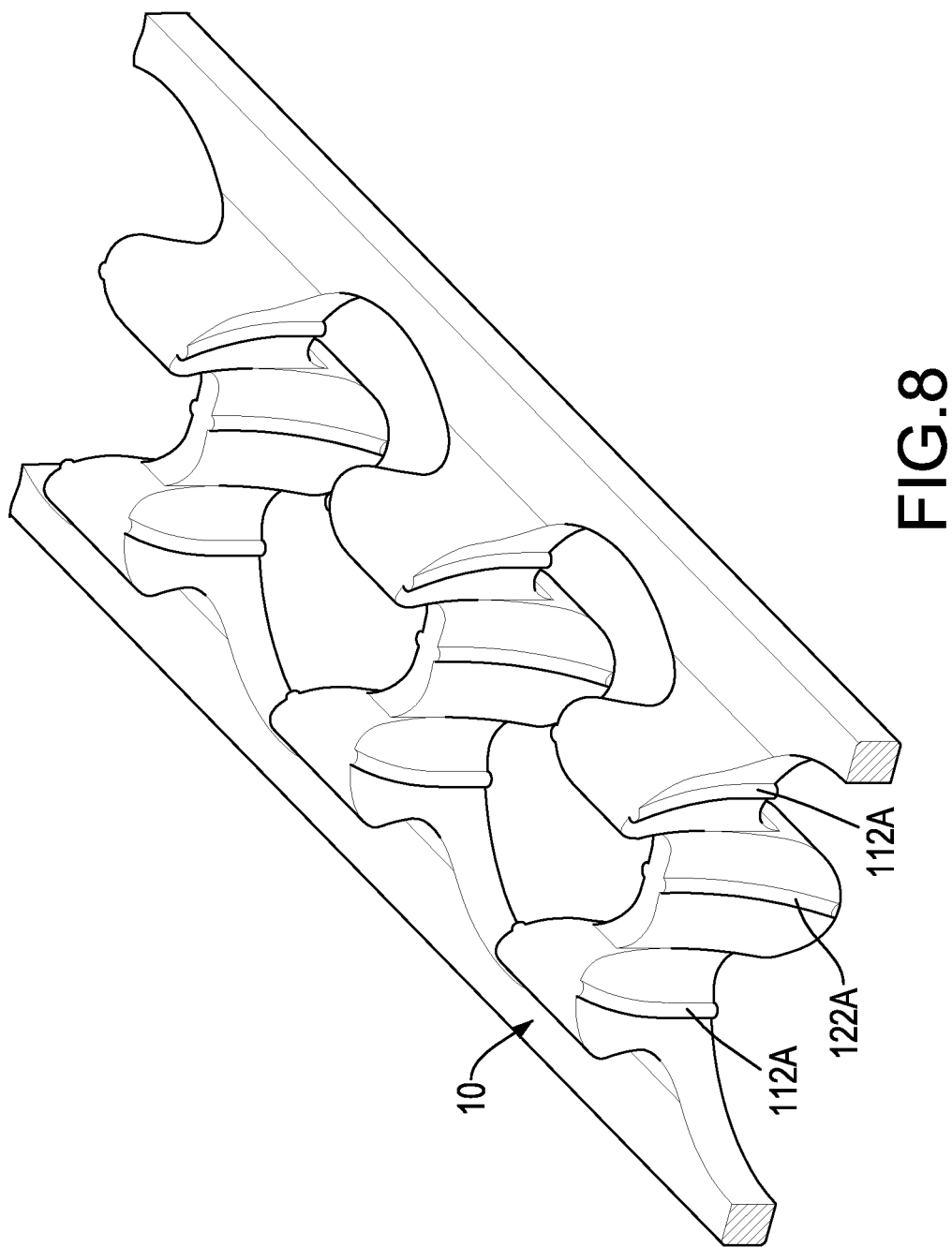
FIG. 8 is an enlarged top perspective view of a second embodiment of the linear guide assembly in accordance with the present invention.
Figure 9:
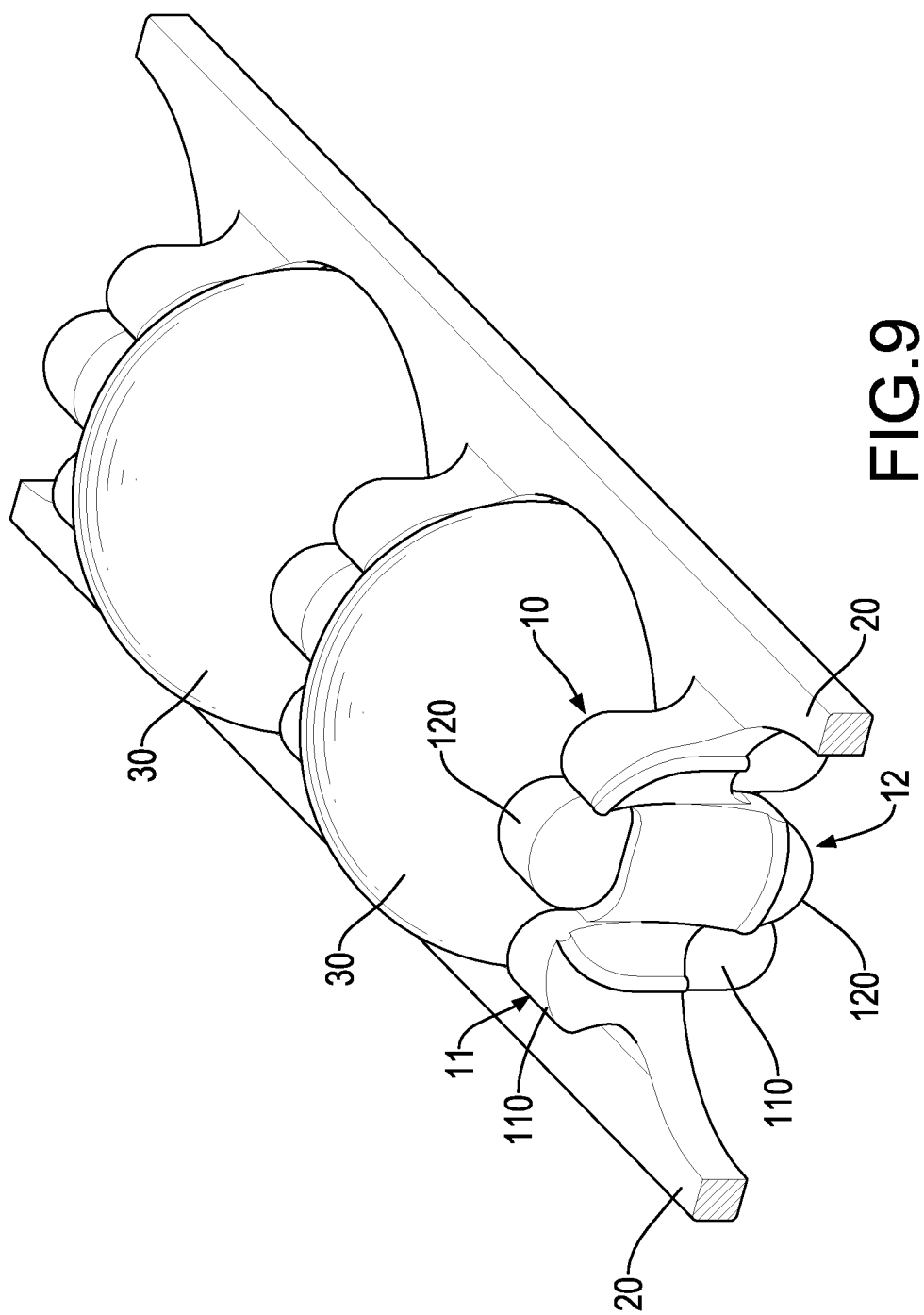
FIG. 9 is an enlarged top perspective view of a third embodiment of the linear guide assembly in accordance with the present invention.
Figure 10:
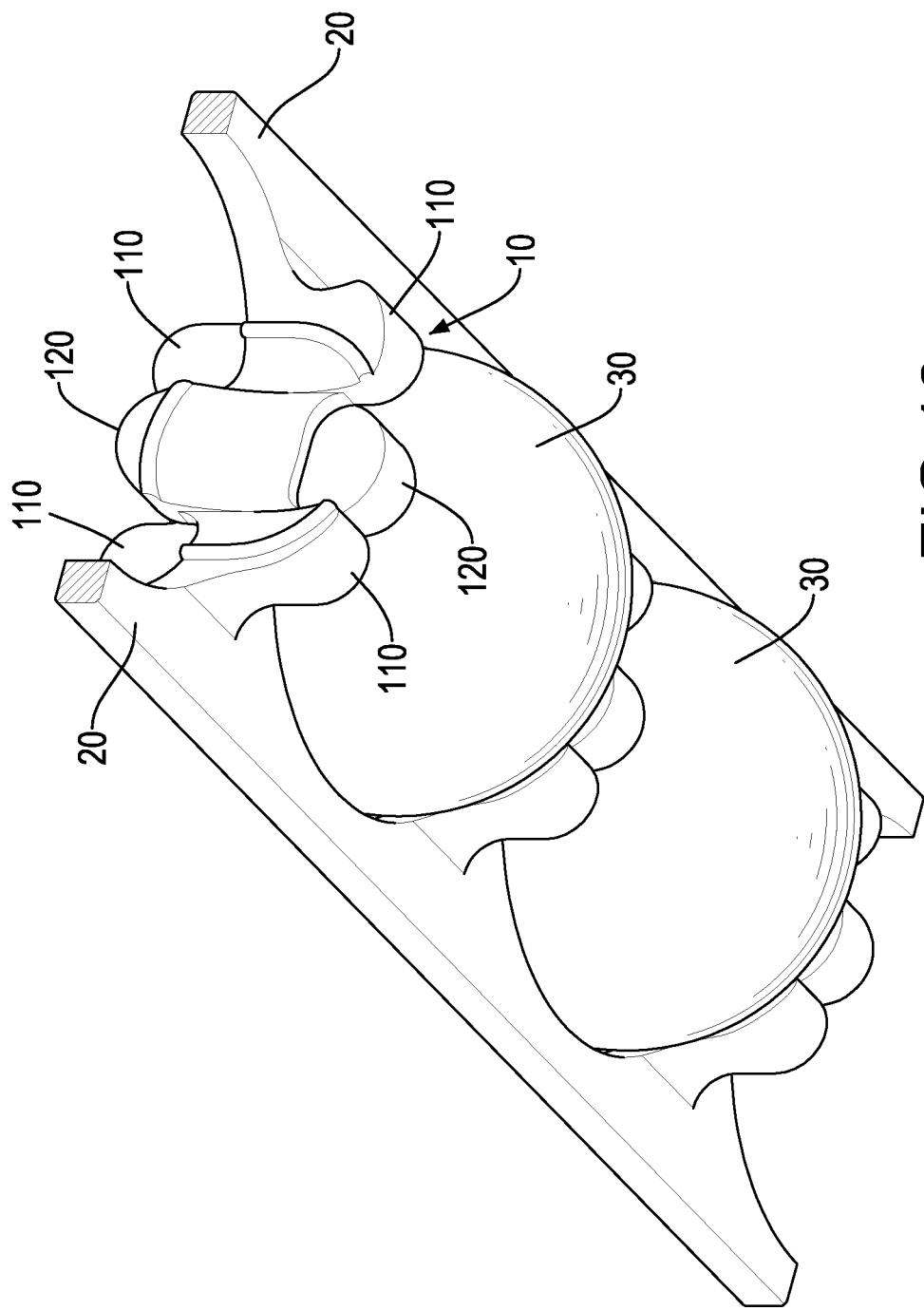
FIG. 10 is an enlarged bottom perspective view of the linear guide assembly in FIG. 9.
Figure 11:
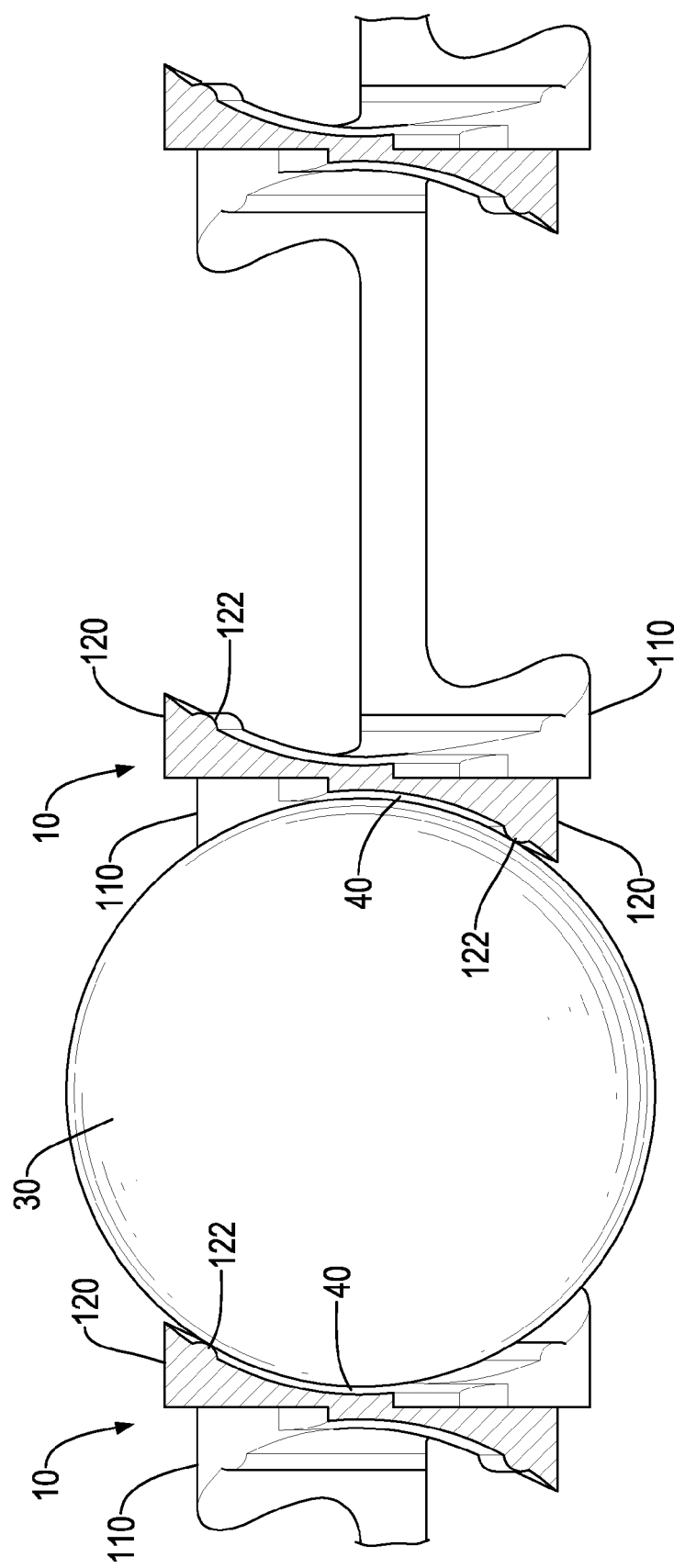
FIG. 11 is an enlarged side view in partial section of the linear guide assembly in FIG. 9.
Figure 12:
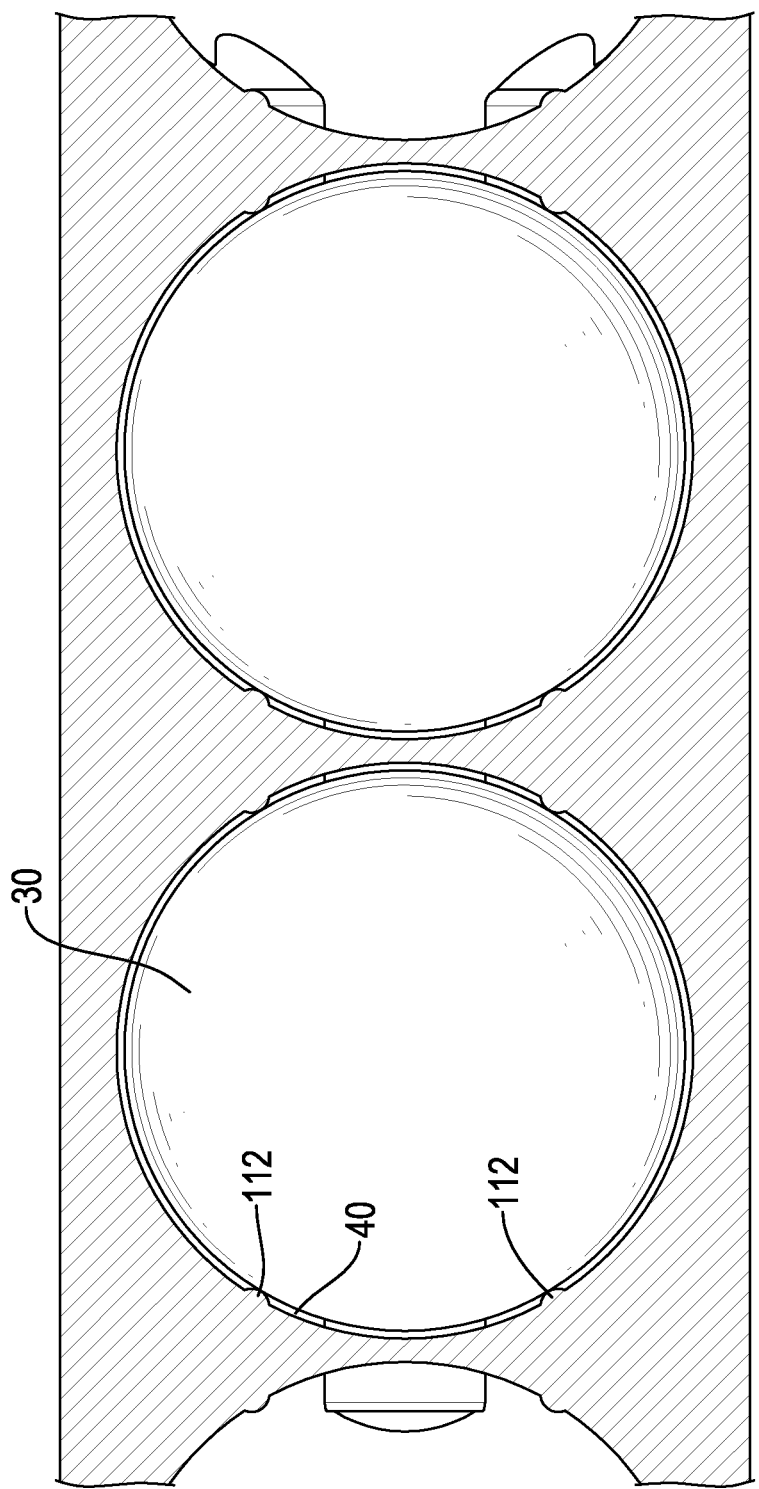
FIG. 12 is an enlarged top view in partial section of the linear guide assembly in FIG. 9.

With reference to FIG. 8, a second embodiment of the linear guide assembly in accordance with the present invention is substantially the same with the first embodiment. Each first protrusion 112A is a longitudinal rib; and each second protrusion 122A is a longitudinal rib.

With reference to FIGS. 9 to 12, a third embodiment of the linear guide assembly in accordance with the present invention is substantially the same with the first embodiment.

One of the first paws 110 of each first restricted section 11 protrudes upwardly and the other first paw 110 of the first restricted section 11 protrudes downwardly. One of the second paws 120 of each second restricted section 12 protrudes upwardly and the other second paw 120 of the second restricted section 12 protrudes downwardly. A protruding direction of each second paw 120 is different from that of an adjacent one of the first paws 110.

Figure 13:
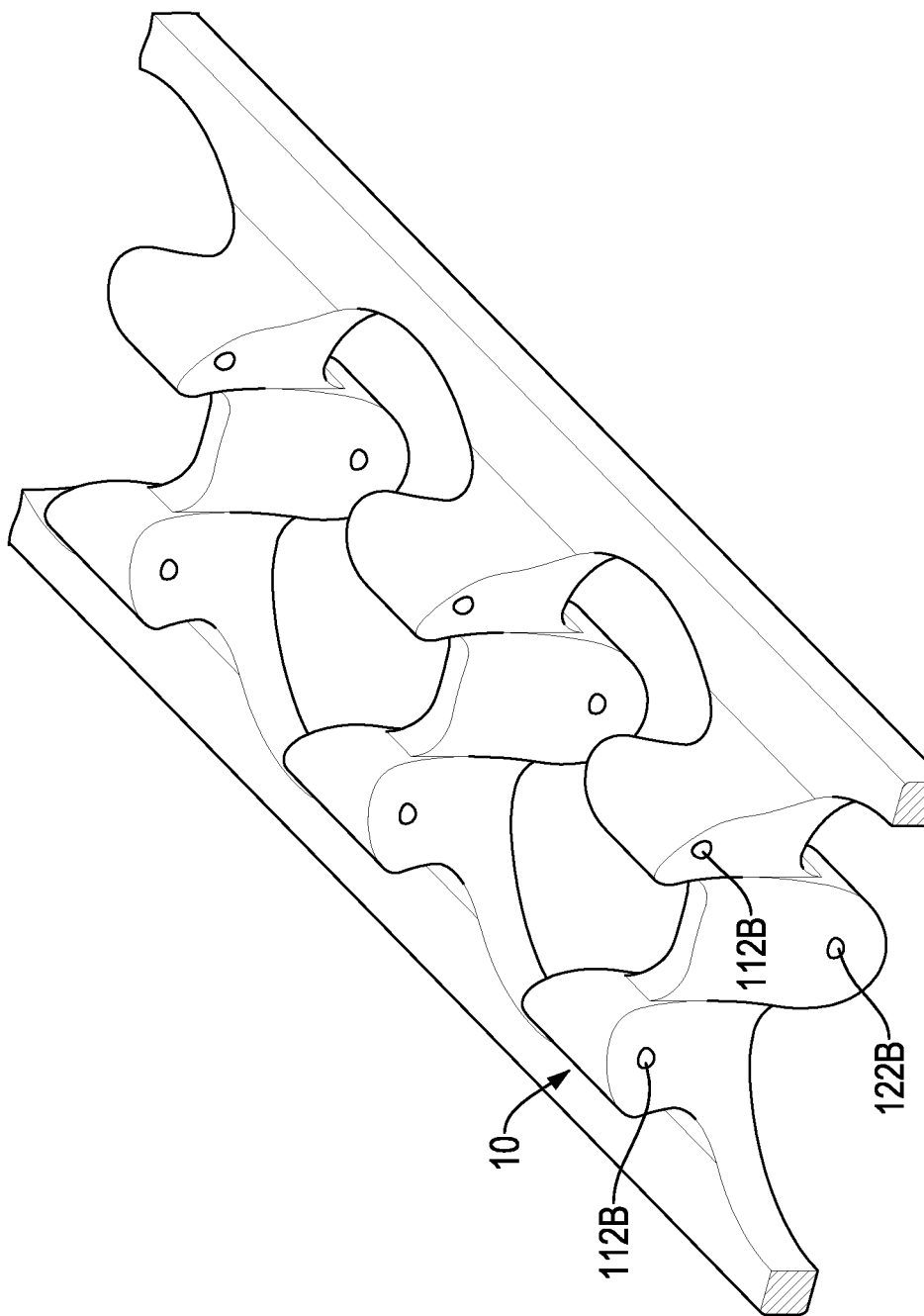
FIG. 13 is an enlarged top perspective view of a fourth embodiment of the linear guide assembly in accordance with the present invention.
Figure 14:
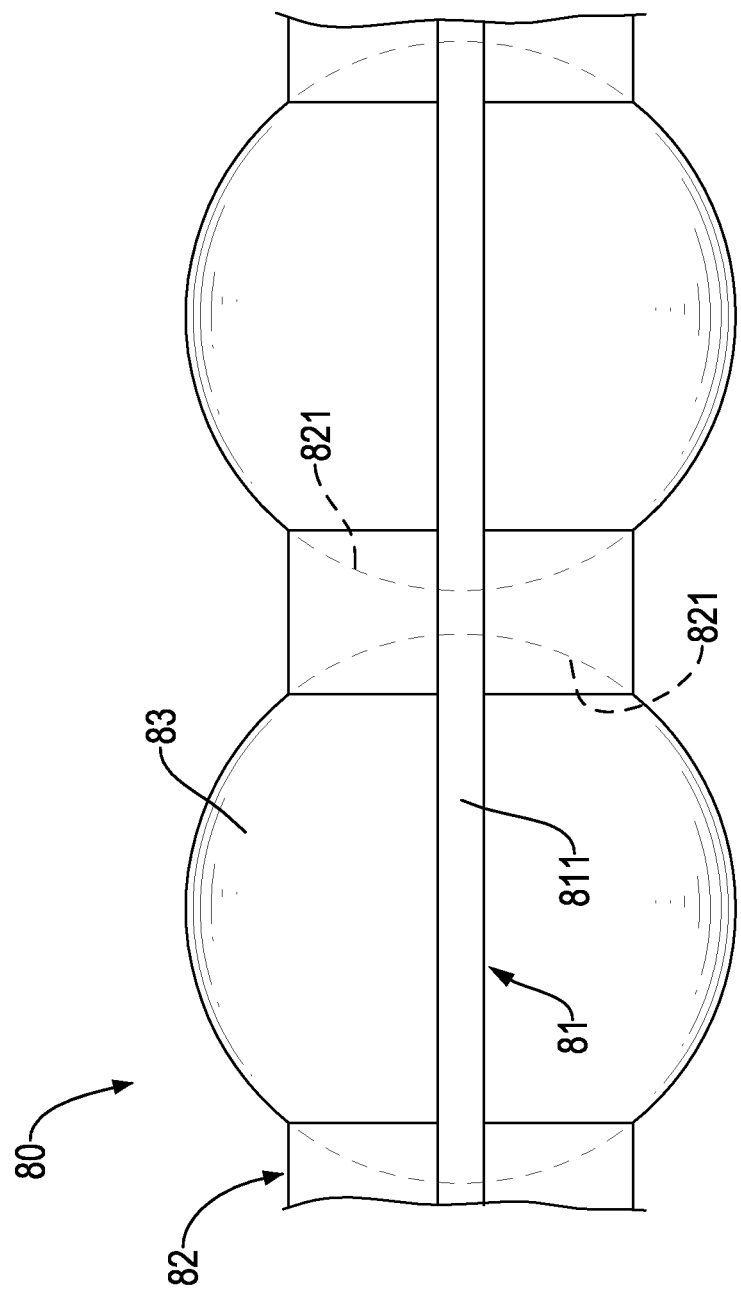
FIG. 14 is a partial side view of a conventional linear guide assembly in accordance with the prior art.

With reference to FIG. 13, a fourth embodiment of the linear guide assembly in accordance with the present invention is substantially the same with the first embodiment. Each first protrusion 112B is a lump, and each second protrusion 122B is a lump.

From the above description, it is noted that the present invention has the following advantages:

1. Point-Contact Configuration:

With the first protrusions 112,112A,112B and the second protrusions 122,122A,122B being in point-contact with the corresponding rolling ball 30, the outer surface of each rolling ball 30 is lubricated by more oil than a conventional rolling ball is. Accordingly, a friction between each rolling ball 30 and the two adjacent partitions 10 is effectively reduced, and the rolling balls 30 can rotate greatly smoothly.

2. Protuberant Structure:

Because the first protrusions 112,112A,112B and the second protrusions 122,122A,122B are protuberant and the protruding direction of each second paw 120 is different from that of the adjacent one of the first paws 10, the first protrusions 112,112A,112B and the second protrusions 122,122A, 122B are capable of surrounding the rolling balls 30 well and prevent the rolling balls 30 from falling off.

3. Excellent Lubrication:

The oil-storage areas 40 can effectively contain the oil that lubricates the rotation of the rolling ball 30. Because the two oil-storage areas 40 of each containing space S communicate with each other, the oil is filled within the containing space S evenly such that the rolling ball 30 can rotate smoothly. Thus, the noise of the linear guide assembly is also reduced.

4. Steady Maintenance:

In the first embodiment, the first protrusions 112 and the second protrusions 122 are arcuate, so the first protrusions 112 and the second protrusions 122 can still be in point-contact with the corresponding rolling ball 30 even when the rolling ball 30 are shifted from the corresponding containing space S. The arcuate the first protrusions 112 and the second protrusions 122 also help the corresponding rolling ball 30 to stably stay in a central position of the containing space S, to reduce a shifting degree of the rolling ball 30, and to make the rolling ball 30 smoothly rotate.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A linear guide assembly comprising:
    a resilient bar device having
        a front side;
        a rear side opposite to the front side of the bar device;
        an extending direction;
        two bars being parallel to each other, each of the bars having
            an inner side facing the inner side of the other bar and having multiple recesses arranged at intervals, wherein the recesses of the bar respectively align with the recesses of the other bar;
    multiple partitions mounted between the bars and arranged at intervals along the extending direction of the bar device, each one of the partitions having
        two first restricted sections respectively and securely mounted on the inner sides of the bars beside the recesses of the bars and aligning with each other, each one of the first restricted sections having
            a front side facing the front side of the bar device;
            a rear side opposite to the front side of the first restricted section;
            two concave first restricted surfaces respectively formed on the front side of the first restricted section and the rear side of the first restricted section; and
            two first protrusions respectively protruding from the first restricted surfaces; and
        a second restricted section located between the first restricted sections and having
            a front side facing the front side of the bar device;
            a rear side opposite to the front side of the second restricted section;
            two concave second restricted surfaces respectively formed on the front side of the second restricted section and the rear side of the second restricted section; and
            two second protrusions respectively protruding from the second restricted surfaces;
    multiple containing spaces formed between the bars beside the partitions and arranged at intervals along the extending direction of the bar device, each one of the containing spaces formed between adjacent two of the partitions and two of the recesses that align with each other; and
    multiple rolling balls respectively and rotatably mounted in the containing spaces, each one of the rolling balls being in point-contact with the first protrusions of adjacent two of the partitions and the second protrusions of the adjacent two of the partitions.

2. The linear guide assembly as claimed in claim 1, wherein each first restricted section has
    two first paws protruding upwardly and respectively facing the front side of the bar device and the rear side of the bar device; and
each second restricted section has
    two second paws protruding downwardly and respectively facing the front side of the bar device and the rear side of the bar device.

3. The linear guide assembly as claimed in claim 2, wherein each first paw has
    a proximal end;
    a distal end opposite to the proximal end of the first paw and protruding toward a corresponding adjacent one of the containing spaces such that the distal end of the first paw is protuberant relative to the proximal end of the first paw, wherein a thickness of the distal end of each first paw is larger than a thickness of the proximal end of the first paw; and
each second paw has
    a top end;
    a bottom end opposite to the top end of the second paw and protruding toward a corresponding adjacent one of the containing spaces such that the bottom end of the second paw is protuberant relative to the top end of the second paw, wherein a thickness of the bottom end of each second paw is larger than a thickness of the top end of the second paw.

4. The linear guide assembly as claimed in claim 1, wherein each first restricted section has
two first paws respectively facing the front side and the rear side of the bar device, wherein one of the first paws protrudes upwardly and the other first paw protrudes downwardly;

each second restricted section has
two second paws respectively facing the front side and the rear side of the bar device, wherein one of the second paws protrudes upwardly and the other second paw protrudes downwardly; and a protruding direction of each second paw is different from that of an adjacent one of the first paws.

5. The linear guide assembly as claimed in claim 4, wherein each first paw has
a proximal end;
a distal end opposite to the proximal end of the first paw and protruding toward a corresponding adjacent one of the containing spaces such that the distal end of the first paw is protuberant relative to the proximal end of the first paw, wherein a thickness of the distal end of each first paw is larger than a thickness of the proximal end of the first paw;

each second paw protruding downwardly has
a top end;
a bottom end opposite to the top end and protruding toward a corresponding adjacent one of the containing spaces such that the bottom end of the second paw protruding downwardly is protuberant relative to the top end of the second paw protruding downwardly, wherein a thickness of the bottom end of each second paw protruding downwardly is larger than a thickness of the top end of the second paw protruding downwardly; and each second paw protruding upwardly has
a bottom end;
a top end opposite to the bottom end and protruding toward a corresponding adjacent one of the containing spaces such that the top end of the second paw protruding upwardly is protuberant relative to the bottom end of the second paw protruding upwardly, wherein a thickness of the top end of each second paw protruding upwardly is larger than a thickness of the bottom end of the second paw protruding upwardly.

6. The linear guide assembly as claimed in claim 5, wherein each containing space has two oil-storage areas;
the two oil-storage areas of each containing space are respectively located at two opposite sides of a corresponding one of the rolling balls, each oil-storage area being formed between the side of a corresponding adjacent one of the rolling balls, the two first protrusions of a corresponding adjacent one of the partitions, and the second protrusion of the corresponding adjacent one of the partitions.

7. The linear guide assembly as claimed in claim 6, wherein each first protrusion is an arcuate rib;
each second protrusion is an arcuate rib; and
the two first protrusions and the second protrusion which are in point-contact with the same side of a corresponding one of the rolling balls are arranged at a circular line.

8. The linear guide assembly as claimed in claim 6, wherein each first protrusion is a longitudinal rib; and each second protrusion is a longitudinal rib.

9. The linear guide assembly as claimed in claim 6, wherein each first protrusion is a lump; and each second protrusion is a lump.

10. The linear guide assembly as claimed in claim 1, wherein
each containing space has two oil-storage areas;
the two oil-storage areas of each containing space are respectively located at two opposite sides of a corresponding one of the rolling balls, each oil-storage area being formed between the side of a corresponding adjacent one of the rolling balls, the two first protrusions of a corresponding adjacent one of the partitions, and the second protrusion of the corresponding adjacent one of the partitions.

11. The linear guide assembly as claimed in claim 1, wherein
each first protrusion is an arcuate rib;
each second protrusion is an arcuate rib; and
the two first protrusions and the second protrusion which are in point-contact with the same side of a corresponding one of the rolling balls are arranged at a circular line.

12. The linear guide assembly as claimed in claim 1, wherein each first protrusion is a longitudinal rib; and each second protrusion is a longitudinal rib.

13. The linear guide assembly as claimed in claim 1, wherein each first protrusion is a lump; and each second protrusion is a lump.

* * * * *